(12) United States Patent
Guyomard et al.

(10) Patent No.: US 8,632,904 B2
(45) Date of Patent: Jan. 21, 2014

(54) METHOD OF PRODUCING ELECTRODE COMPOSITE MATERIAL

(75) Inventors: Dominique Guyomard, Sautron (FR); Delphine Guy, Angerville (FR); Bernard Lestriez, Nantes (FR); Joël Gaubicher, Nantes (FR); Marc Deschamps, Quimper (FR)

(73) Assignees: Blue Solutions, Quimper (FR); Centre National de la Recherche Scientifique, Paris (FR)

( * ) Notice: Subject to any disclaimer, the term of this patent is extended or adjusted under 35 U.S.C. 154(b) by 1210 days.

(21) Appl. No.: 10/548,269

(22) PCT Filed: Mar. 5, 2004

(86) PCT No.: PCT/FR2004/000529
§ 371 (c)(1),
(2), (4) Date: Jun. 27, 2006

(87) PCT Pub. No.: WO2004/082047
PCT Pub. Date: Sep. 23, 2004

(65) Prior Publication Data
US 2006/0263688 A1 Nov. 23, 2006

(30) Foreign Application Priority Data
Mar. 7, 2003 (FR) .................................... 03 02891

(51) Int. Cl.
*H01M 4/62* (2006.01)
*B05D 5/12* (2006.01)
(52) U.S. Cl.
USPC ......... 429/128; 429/217; 29/623.1; 29/623.5; 502/101; 252/182.1; 361/502
(58) Field of Classification Search
USPC ............... 429/217; 29/623.1–623.5; 502/101; 252/182.1; 361/502
See application file for complete search history.

(56) References Cited

U.S. PATENT DOCUMENTS 5,550,173 A * 8/1996 Hammond et al. ............ 523/122
5,614,334 A * 3/1997 Kamauchi et al. ............ 429/217
(Continued)

FOREIGN PATENT DOCUMENTS

EP  1 294 040 A2  3/2003
FR  2 766 970  5/1999
(Continued)

OTHER PUBLICATIONS

Choi, Nam-Soon, et al., "Effect of cathode binder on electrochemical properties of lithium rechargeable polymer batteries", *Journal of Power Sources* 112:61-66 (2002).
(Continued)

*Primary Examiner* — Ula C Ruddock
*Assistant Examiner* — Amanda Barrow
(74) *Attorney, Agent, or Firm* — Merchant & Gould (57) ABSTRACT

The invention relates to a method for producing a material for a composite electrode.

The method is intended for the preparation of a composite material consisting of an active electrode material M1, a material C1 conferring electronic conductivity, an organic binder and a salt, said binder comprising a polymer P1 having an O, N, P or S heteroatom mass content of 15% or higher, a polymer P2 having an O, N, P or S heteroatom mass content of 5% or less, and a nonvolatile liquid organic solvent S1. It includes a step consisting in preparing a viscous solution containing at least one polymer P1, at least one polymer P2, a material C1, an active electrode material M1 and at least one nonvolatile solvent S1, and a step consisting in forming a film from the viscous solution obtained.

26 Claims, 4 Drawing Sheets

(56) References Cited

U.S. PATENT DOCUMENTS

| | | | |
|---|---|---|---|
| 6,001,507 A * | 12/1999 | Ono et al. | 429/217 |
| 2002/0004159 A1 * | 1/2002 | Totsuka | 429/41 |
| 2002/0042986 A1 * | 4/2002 | Sato et al. | 29/623.5 |
| 2002/0076611 A1 | 6/2002 | Palazzo et al. | |
| 2002/0126439 A1 | 9/2002 | Sato et al. | |
| 2002/0168569 A1 * | 11/2002 | Barriere et al. | 429/217 |
| 2002/0197724 A1 * | 12/2002 | Noronha et al. | 436/95 |
| 2003/0003360 A1 * | 1/2003 | Gorkovenko et al. | 429/213 |
| 2003/0035995 A1 * | 2/2003 | Ohsaki et al. | 429/217 |
| 2003/0039886 A1 | 2/2003 | Zhang et al. | |
| 2003/0039887 A1 * | 2/2003 | Yun et al. | 429/218.1 |
| 2003/0054243 A1 * | 3/2003 | Suzuki et al. | 429/188 |
| 2003/0113627 A1 * | 6/2003 | Choi et al. | 429/218.1 |
| 2008/0132580 A1 * | 6/2008 | Mandavilli et al. | 514/725 |
| 2009/0246782 A1 * | 10/2009 | Kelso et al. | 435/6 |

FOREIGN PATENT DOCUMENTS

| | | | | |
|---|---|---|---|---|
| JP | 07-240233 | * | 9/1995 | H01M 10/40 |
| JP | 10172573 | | 6/1998 | |
| JP | 11-265710 | * | 9/1999 | H01M 4/02 |
| JP | 11265710 | | 9/1999 | |
| WO | 02/073720 A2 | | 9/2002 | |
| WO | WO 02-073720 | * | 9/2002 | H01M 4/62 |
| WO | 2004/008555 A2 | | 1/2004 | |

OTHER PUBLICATIONS

PCT Search Report from PCT/FR2004/000529 mailed Aug. 12, 2005.

* cited by examiner

METHOD OF PRODUCING ELECTRODE COMPOSITE MATERIAL

BACKGROUND OF THE INVENTION

1. Field of the Invention

The present invention relates to a method for producing a material for a composite electrode that can be used in particular in an electrochemical battery or in a supercapacitor, and also to the material obtained.

2. Description of the Related Art

Composite electrodes made of a material comprising the active substance and a polymer, having an oxygen mass content of greater than 15%, as binder are known. In particular PEO has been used for batteries of the dry, lithium metal/polymer type. In batteries of the lithium ion or lithium metal/polymer gel type, which contain a liquid electrolyte, polymers other than PEO are used because of the known solubility of PEO in the liquid electrolytes, this being deleterious to the mechanical cohesion of electrode and electrode/current-collector assemblies during impregnation with the liquid electrolyte.

Also known, from D. Guyomard et al., [Solid State Ionics 69, (1994), 222-237], is the preparation of a composite electrode by a method that consists in introducing the active electrode material and carbon black into a solution of PVDF in cyclopentanone, in coating the paste obtained onto a metal foil that can serve as collector, and in evaporating the cyclopentanone solvent. When in contact with a liquid electrolyte in a battery, the composite electrode is impregnated by the electrolyte, which confers ionic conductivity thereon. The electrolyte may be a solution of a lithium salt in a mixture of nonvolatile solvents, for example EC+DEE (ethylene carbonate+diethoxy-ethane) or EC+DMC (ethylene carbonate+dimethyl carbonate). The nonvolatile solvent for the electrolyte acts as plasticizer for the PVDF.

Furthermore, N-M. Choi et al., [J. Power Sources 112, (2002), 61-66] describe the preparation of a composite electrode in which the binder comprises a PMMA polymer and a PVdF or PVdF-HFP polymer. Cathodes containing, as binder, various PMMA/PVdF or PMMA/PVdF-HFP blends are immersed, after their preparation, in an $LiPF_6$ EC/PC solution before being mounted in an electrochemical cell. The binder for the composite electrode material then consists of the polymer blend and a liquid plasticizer.

SUMMARY OF THE INVENTION

The inventors have now found that the method of preparing the material forming a composite electrode is a key factor in determining the properties of said material and, consequently, the performance of the electrode when it is used in an electrochemical device, for example a battery, in particular a lithium battery.

Thus, the subject of the invention is a method for preparing a material for a composite electrode, the material obtained, and its use for an electrode of a battery or of a supercapacitor.

The method according to the invention for the preparation of a composite material for electrodes comprises:

a 1st step of preparing a viscous solution containing at least one polymer P1 that has an O, N, P or S heteroatom mass content of 15% or higher, at least one polymer P2 that has an O, N, P or S heteroatom mass content of 5% or less, a material C1 conferring electronic conductivity, an active electrode material M1, and at least one nonvolatile solvent S1; and a 2nd step of producing a film from the viscous solution obtained.

The method may further include a step consisting in adding a salt. The salt may be introduced into the material either by adding said salt (by itself or in solution in a volatile solvent) during the preparation of the viscous solution, or by impregnating the film obtained from the viscous solution with a solution of said salt in a volatile solvent. The salt is chosen according to the intended use of the composite material. For example, if the composite material is intended to form an electrode for a lithium battery, the salt is chosen from lithium salts. When the material is intended to form an electrode for a supercapacitor, the salt is preferably chosen from salts with heavy cations.

The method may also include a densification step in which heat and pressure are applied to the film. The pressure is preferably between 10 and 1 000 bar and the temperature between 50° C. and 140° C. This step may be carried out using a calender.

During preparation of the viscous solution, the polymers P1 and P2 are introduced in the pure state or in the form of a solution in a volatile solvent; C1 is introduced in the pure state or in the form of a suspension or solution (depending on its nature) in a volatile solvent.

The polymer P1 interacts strongly with the nonvolatile solvent S1, with the material C1 conferring electronic conductivity and with the active electrode material M1. The polymer P1 may be chosen from polyethers, poly-esters, polyacrylic polymers, polycarbonates, poly-imines, polyamides, polyacrylamides, polyurethanes, polyepoxides, polyphosphazenes and polysulfones. The polymers P1 that are particularly preferred are those in which the heteroatom is O or N. By way of examples, mention may be made of: polyethers such as ethylene oxide, methylene oxide, propylene oxide, epichlorohydrin and allyl glycidyl ether homopolymers and copolymers, or polyesters such as ethylene terephthalate, butylene terephthalate and vinyl acetate homopolymers and copolymers; polyacrylic polymers such as acrylamide, methyl acrylate, ethyl acrylate, propyl acrylate, butyl acrylate, ethylhexyl acrylate, stearyl acrylate, ethylene glycol diacrylate, triethylene glycol dimethacrylate, methyl methacrylate and acrylic acid homopolymers and copolymers; acrylonitrile homopolymers and copolymers; vinyl acetate and vinyl alcohol homopolymers and copolymers;

polycarbonates such as homopolymers and copolymers of the carbonate of bisphenol A; and polyethyleneimines. Mention may also be made of polysulfones, such as vinylpyrrolidone or vinyl sulfone homopolymers and copolymers. The term "copolymer" is understood in the present text to mean a polymer compound obtained from at least two different monomers. Polyethylene oxide PEO and polymethyl methacrylate PMMA are particularly useful.

The polymer P2 interacts weakly with M1 and with C1. As an example, mention may be made of vinyl chloride, vinylidene fluoride, vinylidene chloride, tetrafluoro-ethylene and chlorotrifluoroethylene homopolymers and copolymers, and vinylidene fluoride/hexafluoropropylene copolymers (PVdF-HFP). Mention may also be made of polyolefins and elastomers, such as ethylene, propylene, styrene, butadiene or chloroprene homopolymers and copolymers.

The nonvolatile liquid organic solvent S1 may consist of one or more compounds chosen from:
  polar aprotic compounds, such as linear or cyclic carbonates, linear or cyclic ethers, linear or cyclic esters, linear or cyclic sulfones, sulfamides and nitriles;
  phthalates, such as dioctyl phthalate, dibutyl phthalate and dimethyl phthalate; and
  low-mass polyethylene glycols and poly(ethylene glycol) dimethyl ethers.

The solvent S1 preferably consists of one or more carbonates chosen from ethylene carbonate (EC), propylene carbonate (PC), dimethyl carbonate, diethyl carbonate and methyl ethyl carbonate.

The compound C1 may consist of graphite, carbon fibers, carbon nanofils, carbon nanotubes, or electronically conductive polymers. Carbon black, which does not catalyze the oxidation of the electrolyte at high potential, is particularly preferred. Many commercial carbon blacks meet this condition. In particular, mention may be made of the compounds Ensagri Super S® and Super P® sold by Chemetals.

When the composite material according to the invention is intended to form a positive electrode, the active material M1 may in particular be chosen from: $Li_{1+x}V_3O_8$, where $0<x<4$; $Li_xV_2O_5 \cdot nH_2O$ (where $0<x<3$ and $0<n<2$); $LiFePO_4$; hydrated or unhydrated iron phosphates and sulfates; hydrated or unhydrated vanadyl phosphates and sulfates [for example $VOSO_4$ and $Li_xVOPO_4 \cdot nH_2O$ (where $0<n<3$ and $0<x<2$)]; $LiNiO_2$; $LiMn_2O_4$ and compounds derived from $LiMn_2O_4$ that are obtained by substitution, preferably with Al, Ni or Co; $LiMnO_2$ and compounds derived from $LiMnO_2$ that are obtained by substitution, preferably with Al, Ni or Co; and $LiCoO_2$ and compounds derived from $LiCoO_2$ that are obtained by substitution, preferably with Al, Ti, Mg, Ni or Mn [for example, $LiAl_xNi_yCO_{(1-x-y)}O_2$, (where $x<0.5$, $y<1$)].

When the composite material according to the invention is intended to form a negative electrode, the active material M1 may in particular be: chosen from:
  carbon compounds (natural or synthetic graphites, disordered carbons, etc.),
  lithium alloys of the $Li_xM$ type (where M=Sn, Sb or Si etc.) (that are obtained from SnO, from $SnO_2$, from Sn, Sn—Fe(—C) compounds, from Si compounds or from Sb compounds); or
  $Li_xCu_6Sn_5$ compounds (where $0<x<13$), iron borates, pnictures (for example $Li_{3-x-y}Co_yN$, $Li_{3-x-y}Fe_yN$, $Li_xMnP_4$, $Li_xFeP_2$ and $Li_xFeSb_2$ etc.), simple oxides that undergo reversible decomposition (for example CoO, $Co_2O_3$, $Fe_2O_3$ etc.), and insertion oxides, such as $MoO_3$ or $WO_3$ titanates (for example $TiO_2$, $Li_4Ti_5O_{12}$).

The preparation of the viscous solution may be carried out in a single phase or in two successive phases. When it is carried out in two successive phases, a first method of implementation consists in preparing a viscous solution containing all the constituents except for S1, in forming a film from this solution, in drying the film in order to obtain a powder, and then in forming a new viscous solution by adding S1 to this powder, this new solution being used for the 2nd step. A second method of implementation consists in preparing a viscous solution containing all the constituents except for P2, in forming a film from this solution, in drying the film in order to obtain a powder and in forming a new viscous solution by adding a solution of P2 in a volatile solvent to this powder.

The introduction of at least one of the constituents in the form of a solution in a volatile solvent is advantageous because it improves the contact between the various constituents of the viscous solution and it favors the precipitation of P2 in crystallized form. Said volatile solvent is then removed while the film is being dried, the solvent not constituting a component of the film.

The film may be obtained from the viscous solution by any conventional means, for example by extrusion, or by coating on a substrate followed by a drying step. In the latter case, it is advantageous to use, as substrate, a metal foil capable of serving as collector for the electrode, for example an aluminum or stainless steel foil or mesh, or a copper or nickel foil or mesh treated with an anticorrosion coating. The film on the substrate thus obtained may be used directly as electrode.

The composite material according to the invention consists of the active electrode material M1, the material C1 conferring electronic conductivity, and an organic binder that comprises a polymer P1 having an O, N, P or S heteroatom mass content of 15% or higher, a polymer P2 having an O, N, P or S heteroatom mass content of 5% or less and a nonvolatile liquid organic solvent S1. It is characterized in that, both on the micron scale and the submicron scale:
  the polymer P1 and the material C1 conferring electronic conductivity form a dense, homogeneous and continuous phase around the particles of active material;
  the polymer P2 is in the form of a dispersed phase which contains no or very little material C1 (generally less than 5% by mass) and the morphology of which phase, which is of the sphere, cylinder, needle or ribbon type, creates porosity.

The material may furthermore contain a salt.

The polymers P1 and P2, the material C1, the nonvolatile solvent S1, the active electrode material M1 and the salt are as defined above.

The presence of the nonvolatile organic liquid solvent S1 in the material may be detected, on the one hand, by TGA (thermogravimetric analysis) and, on the other hand, by the IR spectrum in which the specific lines corresponding to the solvent are visible.

The structure of the binder may be observed, on a micron and submicron scale, on a specimen by SEM (scanning electron microscopy) and by AFM (atomic force microscopy).

The material according to the invention is useful for producing electrodes for electrochemical devices, especially in lithium batteries, or for supercapacitors. Another object of the invention is a composite electrode made of the material according to the invention.

A lithium battery comprises a negative electrode made of lithium metal, a lithium alloy or a lithium insertion compound, and a positive electrode, the two electrodes being separated by the electrolyte containing a lithium salt. The positive electrode may be a composite electrode according to the invention, containing a positive electrode active material as defined above. When the negative electrode consists of a lithium insertion compound, it may also be made of a material according to the invention in which the active material is a negative electrode active material as defined above. In the negative or positive composite electrodes of the lithium battery, the salt of the composite material is a lithium salt, preferably identical to the lithium salt of the electrolyte, for example $LiPF_6$, $LiAsF_6$, $LiClO_4$, $LiBF_4$, $LiC_4BO_8$, $Li(C_2F_5SO_2)_2N$, $Li[(C_2F_5)_3PF_3]$, $LiCF_3SO_3$, $LiCH_3SO_3$ and $LiN(SO_2CF_3)_2$. Particularly preferred is $LiN(SO_2CF_3)_2$.

A supercapacitor is formed by two electrodes of high specific surface area that are separated by an electrolyte. The positive and negative composite electrodes as defined above may be used in a supercapacitor. The salt of the composite material is preferably chosen from salts with a heavy cation. As examples, mention may be made of salts comprising $R_3O^+$ (oxonium), $NR_4^+$ (ammonium), $RC(NHR_2)_2^+$ (amidinium), $C(NHR_2)_3^+$ (guanidinium), $C_5R_6N^+$ (pyridinium), $C_3R_5N_2^+$ (imidazolium), $C_3R_7N_2^+$ (imidazolinium), $C_2R_4N_3^+$ (triazolium), $SR_3^+$ (sulfonium), $PR_4^+$ (phosphonium), $IR_2^+$ (iodonium) or $(C_6R_5)_3C^+$ (carbonium), in which the radicals R may be identical or different, said radicals preferably being chosen from alkyl, alkenyl, oxaalkyl, oxaalkenyl, azaalkyl, azaalkenyl, thiaalkyl, thiaalkenyl, silaalkyl, silaalkenyl, aryl, arylalkyl, alkylaryl, alkenylaryl, dialkylamino and dialkylazo radicals, said radicals preferably having at most 5 carbon atoms. It is particularly advantageous to use for the electrolyte a salt identical to that forming part of the material of the electrode.

The present invention is illustrated by the following examples, however it is not limited thereto. Electrodes according to the prior art were also prepared and their performance tested relative to the electrodes of the invention.

EXAMPLE 1

A positive electrode was prepared that consisted of a composite material with the following composition by weight:
13% PEO having a molar mass of 300 000 g/mol;
13% of a PVdF-HFP copolymer containing 12% HFP by weight;
20% of an EC/PC (50/50 by vol.) mixture;
43% of $LiV_3O_8$; and
11% of carbon.

A homogeneous suspension of carbon and $LiV_3O_8$ in acrylonitrile and a solution of EC, PC, PEO and PVdF-HFP in acrylonitrile were prepared. Next, the solution was added to the suspension and the mixture was kept at room temperature for 24 h in order to obtain a viscous solution.

An aluminum foil was coated with the viscous solution, which was left in air to allow the acrylonitrile to evaporate, before being placed in a vacuum oven at 50° C. for 12 hours. The assembly thus obtained was able to form the positive electrode [denoted hereinafter by electrode (a)] of a battery.

Figure 1:
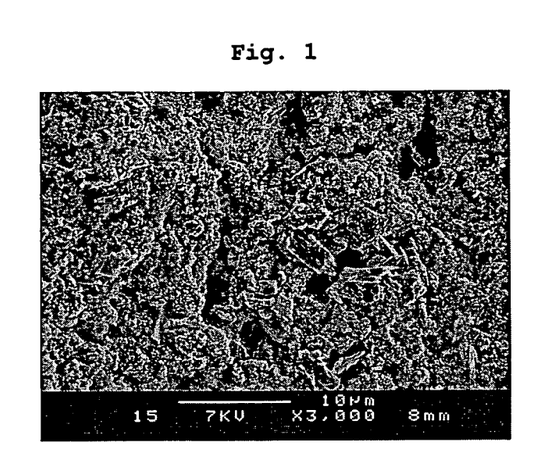
FIG. 1 shows a SEM micrograph of a composite material.
Figure 2:
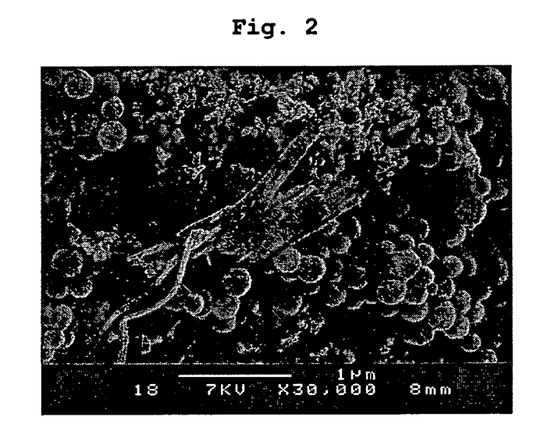
FIG. 2 shows a SEM micrograph of a composite material at higher magnification than FIG. 1.

FIGS. 1 and 2 show SEM micrographs of the composite material obtained, at magnifications of 300 and 30 000, respectively. It is apparent that the method according to the invention produces a material in which the polymer P1 (PEO) is uniformly impregnated with the nonvolatile solvent, serving as plasticizer. The particles of active material are uniformly encapsulated by the PEO/carbon black mixture plasticized by the plasticizing liquid solvent EC+PC, thereby increasing the ionic conductivity and the electronic conductivity of the composite electrode. The presence of the polymer P2 (PVdF-HFP), which does not interact with the surface of the active material and with the carbon black, creates porosity in the material of the electrode, which favors the absorption of a liquid electrolyte and consequently increases the ionic conductivity.

The electrode (a) was mounted in a battery having a lithium anode and a liquid electrolyte consisting of an LiTFSI solution in an EC/PC mixture. The cycling performance was measured and compared with that of a similar battery in which the positive electrode was an electrode (b) whose initial composition was 54% $LiV_3O_8$, 14% C, 16% PVdF-HFP and 16% PEO, the EC/PC mixture being introduced afterwards by impregnation of the electrode with the electrolyte during cycling, using a technique similar to that of the aforementioned Choi prior art. The cycling was carried out between 3.3 V and 2 V, under D/5-C/10 reduction-oxidation conditions.

Figure 3:
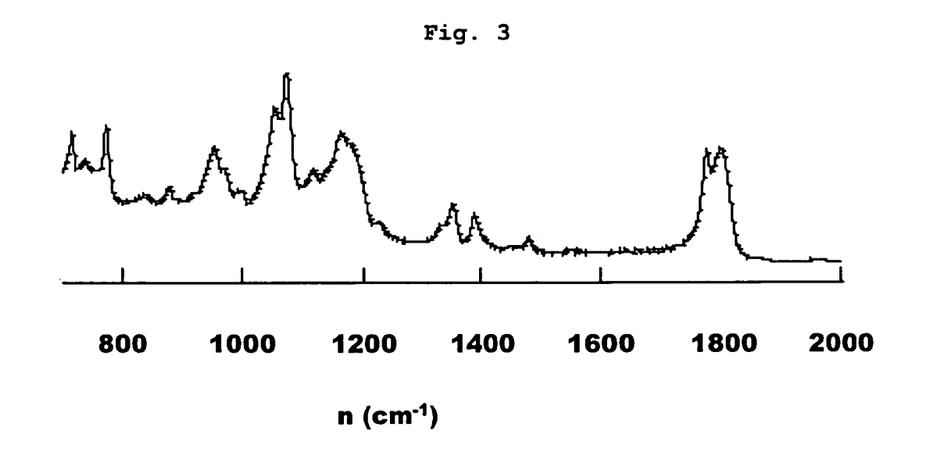
FIG. 3 provides the ATR-IR spectrum for a composite material according to the invention.
Figure 4:
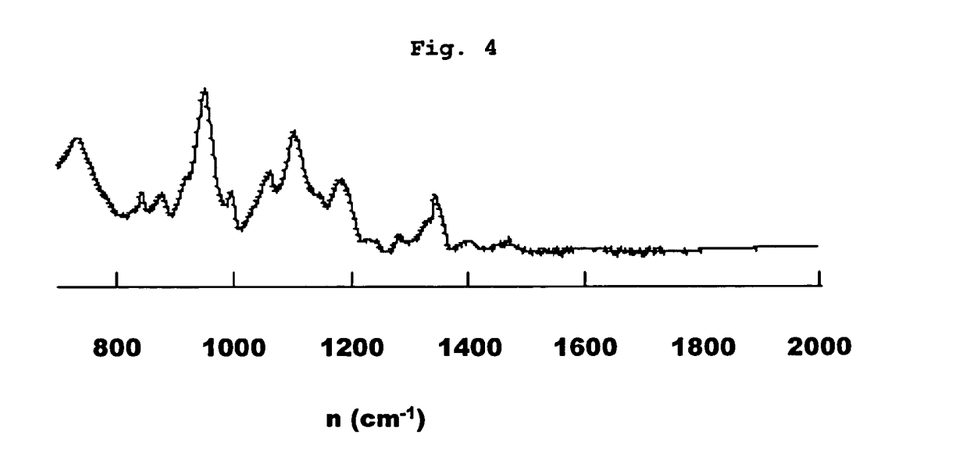
FIG. 4 provides the ATR-IR spectrum for a composite material.

The ATR-IR (attenuation total reflectance infrared) spectra as a function of the wavenumber (in $cm^{-1}$) are shown in FIG. 3 for the composite material according to the invention constituting the electrode (a) and in FIG. 4 for the composite material whose initial composition was that of the electrode (b). It may be seen that the material obtained according to the invention has a different ATR-IR signature from that of the material obtained according to the prior art. This difference is the presence of absorption peaks from the nonvolatile solvent (in this case, EC/PC at 1 775 and 1 800 $cm^{-1}$).

Figure 5:
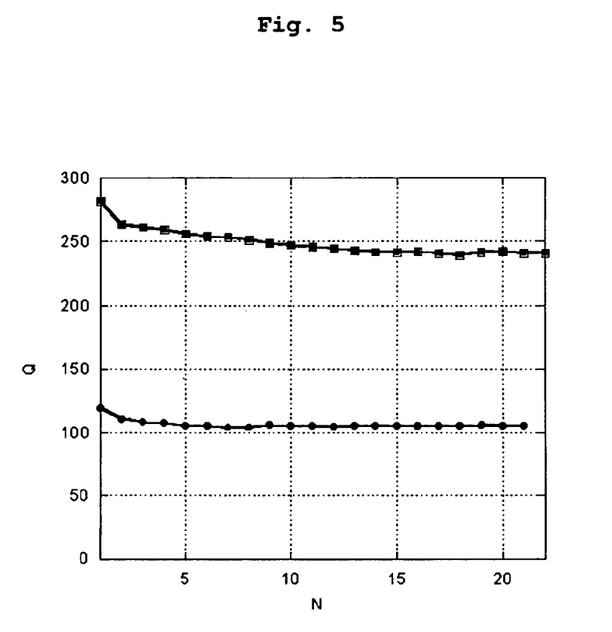
FIG. 5 graphically depicts the variation in capacity Q as a function of the number of cycles N in regard to Example 1.

FIG. 5 shows the variation in capacity Q (in mAh/g) as a function of the number of cycles N. The correspondence between the two curves and the specimens is the following:
curve -v--v-: specimen a according to the invention;
curve -λ--λ-: comparative specimen b.

By comparing the cycling curves, it may be seen that there is a substantial improvement in the capacity when the EC/PC solvent is introduced during the manufacture of the composite material constituting the electrode.

EXAMPLE 2

Three positive electrodes were prepared in the same manner as in example 1, these consisting of a material whose composition (in parts by weight) was the following:

| Constituent | Specimen b | Specimen c | Specimen d |
| --- | --- | --- | --- |
| $LiV_3O_8$ | 59.5 | 38 | 38 |
| Carbon | 4.9 | 10 | 10 |
| PVdF-HFP | 4.5 | 11 | 11 |
| PEO | 0 | 0 | 11 |
| PMMA | 1.1 | 11 | 0 |
| 50/50 EC/PC | 30 | 30 | 30 |

A homogeneous suspension of carbon and $LiV_3O_8$ in acrylonitrile and a solution of EC, PC, PEO and PVdF-HFP in acrylonitrile were prepared (for specimen d) and also an EC, PC, PMMA and PVdF-HFP solution in an acrylonitrile/THF mixture (for specimens c and d). For each trial, the solution was then added to the suspension and the mixture kept at room temperature for 24 h, in order to obtain a viscous solution.

An aluminum foil was coated with the viscous solution, which was left in the air in order to allow the volatile solvent to evaporate, before being placed in a vacuum oven at 50° C. for 12 hours.

Each of the electrodes thus obtained was mounted in a battery having a lithium anode and a liquid electrolyte consisting of an LiTFSI solution in an EC/PC mixture. The cycling performance was measured.

For comparison, a composite electrode according to the aforementioned Choi et al. prior art was also prepared, which contained no plasticizing nonvolatile solvent and had the following initial composition (in parts by weight) (for specimen a):

| LiV$_3$O$_8$ | Carbon | PVdF-HFP | PMMA |
|---|---|---|---|
| 85 | 7 | 6.4 | 1.6 |

A homogeneous suspension of carbon and LiV$_3$O$_8$ in acrylonitrile and a solution of PMMA and PVdF-HFP in an acrylonitrile/THF mixture were prepared. Next, the solution was added to the suspension and the mixture kept at room temperature for 24 h, in order to obtain a viscous solution. An aluminum foil was coated with the viscous solution, which was left in air in order to allow the volatile solvent to evaporate, before being placed in a vacuum oven at 50° C. for 12 hours. The assembly thus obtained formed a positive electrode, which was mounted in a battery similar to that used for the electrodes according to the invention, and the cycling performance was measured under conditions similar to those used for the three electrodes of the present example, according to the invention.

Figure 6:
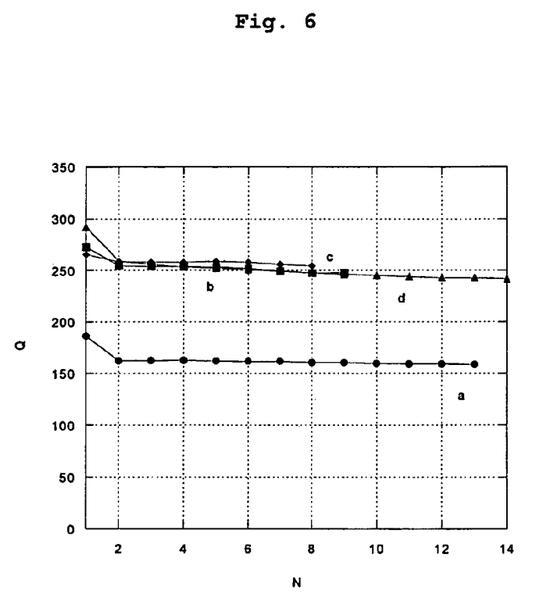
FIG. 6 graphically depicts the variation of the capacity Q as a function of the number of cycles N in regard to Example 2.

FIG. 6 shows the variation of the capacity Q (in MAh/g) as a function of the number of cycles N. The cycling was carried out between 3.3 V and 2 V, under D/5-C/10 reduction-oxidation conditions. The correspondence between the curves and the specimens was as follows:

curve -λ--λ-: specimen a according to the prior art;
curve -ν--ν-: specimen b according to the invention;
curve -υ--υ-: specimen c according to the invention;
curve -σ--σ-: specimen d according to the invention.

Specimen a corresponds to a composite electrode consisting of a material containing only the active electrode material, carbon, the polymer P2 and the polymer P1 (PMMA). Specimen b corresponds to a composite electrode consisting of a material containing 70% by weight of a composite identical to that of specimen a and 30% by weight of an EC/PC plasticizing solvent. As in example 1, the comparison between the respective cycling curves shows a substantial improvement in the capacity when the composite electrode material contains the plasticizing nonvolatile solvent right from the beginning.

Specimens c and d correspond to electrodes consisting of a material similar to that of specimen b, in which either the polymer P1 has been replaced with PEO (specimen c) or the proportion of polymer P1 has been modified. It is apparent that change of polymer P1 or the change of proportions of polymer P1 does not modify the good performance level obtained by the presence of the plasticizing solvent in the composite material right from the beginning.

EXAMPLE 3

A positive electrode was prepared in the same manner as in example 1, this consisting of a material whose composition (in parts by weight) was the following:

| Constituent | Specimen 3 |
|---|---|
| LiV$_3$O$_8$ | 40 |
| Carbon | 10.4 |
| PVdF-HFP | 8.8 |
| PEO | 8.8 |
| LiTFSI | 2 |
| 50/50 EC/PC | 30 |

A homogeneous suspension of carbon and LiV$_3$O$_8$ in acrylonitrile and a solution of EC, PC, LiTFSI, PEO and PVdF-HFP in acrylonitrile were prepared. Next, the solution was added to the suspension and the mixture left at room temperature for 24 h, in order to obtain a viscous solution.

An aluminum foil was coated with the viscous solution, which was left in air to allow the volatile solvent to evaporate, before being placed in a vacuum oven at 50° C. for 1 hour.

The electrode thus obtained was mounted in a battery having a lithium anode and a liquid electrolyte consisting of a solution of LiTFSI in an EC/PC mixture. The cycling performance was measured.

Figure 7:
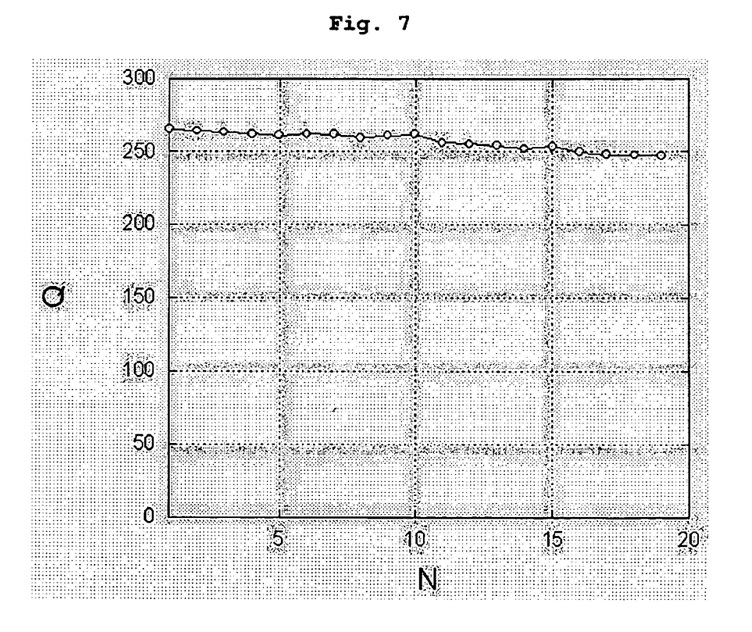
FIG. 7 graphically depicts the variation of the capacity Q as a function of the number of cycles N in regard to Example 3.

FIG. 7 shows the variation in the capacity Q (in mAh/g) as a function of the number of cycles N. The cycling was carried out between 3.7 V and 2 V under D/5-C/10 reduction-oxidation conditions.

The presence right from the beginning of salt and plasticizing solvent in the composite material ensures a high cycling-stable capacity of 250 mAh/g.

EXAMPLE 4

Two positive electrodes were prepared in the same manner as in example 1, these consisting of a material whose composition (in parts by weight) was the following:

| Constituent | Specimen 4a | Specimen 4b |
|---|---|---|
| VOSO$_4$ | 71 | 54 |
| Carbon | 18 | 14 |
| PVdF-HFP | 11 | 8 |
| PEO | 0 | 8 |
| 50/50 EC/PC | 0 | 16 |

A homogeneous suspension of carbon and VOSO$_4$ in acrylonitrile and a solution of EC, PC, PEO and PVdF-HFP in acrylonitrile were prepared (for specimen 3b according to the invention) and also a solution of PVdF-HFP in acrylonitrile (for comparative specimen 3a). Next, each solution was added to the suspension and the mixture was left at room temperature for 24 h, in order to obtain a viscous solution.

An aluminum foil was coated with the viscous solution, which was left in air in order to allow the volatile solvent to evaporate, before being placed in a vacuum oven at 50° C. for 12 hours.

Each of the electrodes thus obtained was mounted in a battery having a lithium anode and a liquid electrolyte consisting of a LiTFSI solution in an EC/PC mixture. The cycling performance was measured.

Figure 8:
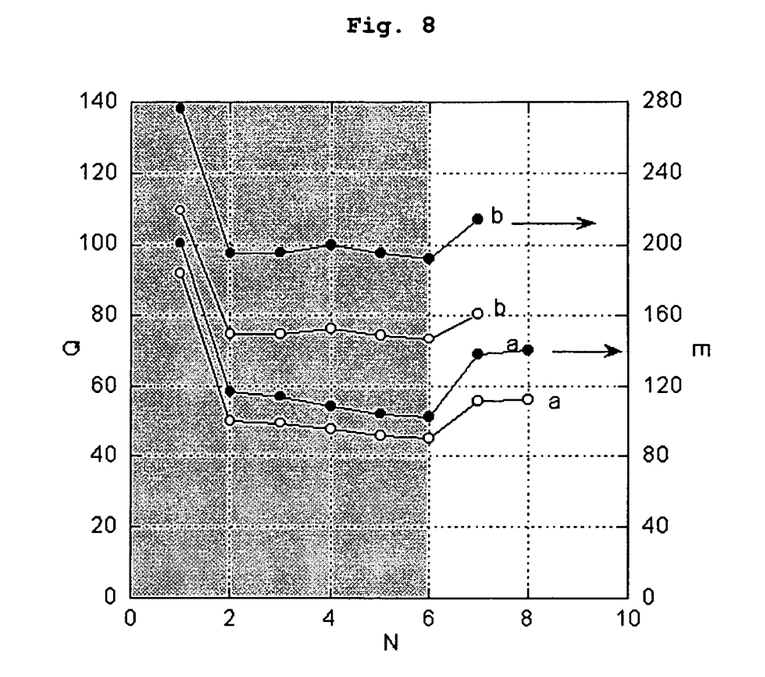
FIG. 8 depicts the variation of the capacity Q and the variation of the energy E as a function of the number of cycles N in regard to Example 4.

FIG. 8 shows the variation of the capacity Q (in mAh/g) (curves denoted by -μ--μ-) and the variation of the energy E (in Wh/kg) (curves denoted by -λ--λ-) as a function of the number of cycles N. The cycling was carried out between 3.5 V and 2.0 V under D/5-C/10 reduction-oxidation conditions for the first six cycles and then D/10-C/10 conditions for the following cycles.

This figure shows an increase in capacity and an increase in energy of about 60% and 82% respectively by using a material containing polymers of the P1 and P2 type and a plasticizing nonvolatile solvent introduced right from the beginning.

EXAMPLE 5

Two positive electrodes were prepared in the same manner as in example 1, these consisting of a composite material whose composition (in parts by weight) was the following:

| Constituent | Specimen 5a | Specimen 5b |
|---|---|---|
| LiFePO$_4$ | 71 | 54 |
| Carbon | 18 | 14 |
| PVdF-HFP | 11 | 8 |
| PEO | 0 | 8 |
| 50/50 EC/PC | 0 | 16 |

A homogeneous suspension of carbon and LiFEPO$_4$ in acrylonitrile and a solution of EC, PC, PEO and PVdF-HFP in acrylonitrile were prepared (for specimen 4b according to the invention) or a solution of PVdF-HFP in acrylonitrile (for comparative specimen 4a). Next, each solution was added to the suspension and the mixture left at room temperature for 24 h, in order to obtain a viscous solution.

An aluminum foil was coated with the viscous solution, which was left in air in order to allow the volatile solvent to evaporate, before being placed in a vacuum oven at 50° C. for 12 hours.

Each of the electrodes thus obtained was mounted in a battery having a lithium anode and a liquid electrolyte consisting of an LiTFSI solution in an EC/PC mixture. The cycling performance was measured.

Figure 9:
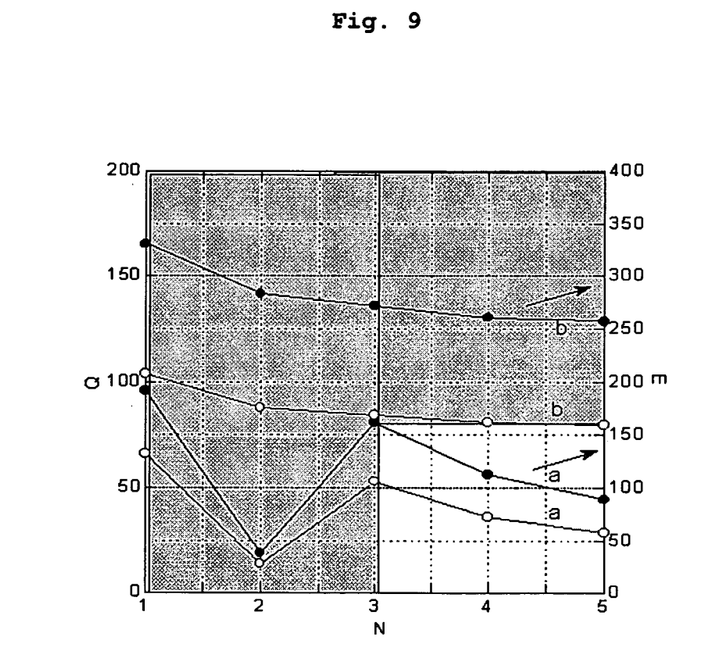
FIG. 9 depicts the variation of the capacity Q and the variation of the energy E as a function of the number of cycles N in regard to Example 5.

FIG. 9 shows the variation in capacity Q (in mAh/g) (curves denoted -μ--μ-) and the variation in the energy E (in Wh/kg) (curves denoted by -λ--λ-) as a function of the number of cycles N. The cycling was carried out between 3.7 and 2.7 V under D/5-C/5 reduction-oxidation conditions in the case of a, and under D/5-C/5 conditions for the first three cycles and then D/10-C/10 conditions for the following cycles in the case of b.

As in the previous examples, it may be seen that there is an increase in capacity and in energy of about 60% and 70% respectively in the first cycle by using a material containing a plasticizing nonvolatile solvent right from the beginning.

The invention claimed is:

1. A method of preparing a composite material for electrodes, which comprises:
    preparing a solution containing at least one polymer P1 that has an O, N, P or S heteroatom mass content of 15% or higher, at least one polymer P2 that has an O, N, P or S heteroatom mass content of 5% or less, and at least one nonvolatile solvent S1 in a volatile solvent;
    preparing a homogeneous suspension of a material C1 conferring electronic conductivity and an active electrode material M1 in a volatile solvent;
    preparing a viscous solution by adding the solution of P1, P2 and S1 in a volatile solvent to the homogeneous suspension of C1 and M1 in a volatile solvent; and
    producing a film from the viscous solution obtained, wherein:
    when the viscous solution is prepared, the nonvolatile solvent S1 uniformly impregnates the polymer P1 in such a way that the polymer P1 and the material C1 conferring electronic conductivity form a dense, homogeneous and continuous phase around the particles of active material M1;
    the polymer P2 forms a dispersed phase which contains no or very little material C1 and the morphology of this phase is of the sphere, cylinder, needle or ribbon type and creates porosity;
    the polymer P1 is selected from the group consisting of polyethers, polyesters, polyacrylic polymers, polycarbonates, polyimines, polyamides, polyacrylamides, polyurethanes, polyepoxides, polyphosphazenes and polysulfones;
    the polymer P2 is selected from the group consisting of vinyl chloride, vinylidene fluoride, vinylidene chloride, tetrafluoroethylene and chlorotrifluoroethylene homopolymers and copolymers, and vinylidene fluoride/hexafluoropropylene copolymers;
    the nonvolatile solvent S1 is a polar aprotic solvent consisting of one or more carbonates selected from the group consisting of ethylene carbonate, propylene carbonate, dimethyl carbonate, diethyl carbonate, methyl ether carbonate and mixtures thereof;
    C1 is comprised of graphite, carbon fibers, carbon nanowires, carbon nanotubes, or electronically conductive polymers.

2. The method as claimed in claim 1, wherein it includes the introduction of a salt into the material.

3. The method as claimed in claim 2, wherein the salt is introduced into the material by adding said salt by itself or in solution in a volatile solvent during preparation of the viscous solution.

4. The method as claimed in claim 2, wherein the salt is introduced by impregnating the film obtained from the viscous solution with a solution of said salt in a volatile solvent.

5. The method as claimed in claim 1, wherein it further includes a densification step comprising applying heat and pressure to the film.

6. The method as claimed in claim 1, wherein the polymer P1 is a polyether selected from the group consisting of ethylene oxide, methylene oxide, propylene oxide, epichlorohydrin and allyl glycidyl ether homopolymers and copolymers, or a polyester selected from the group consisting of ethylene terephthalate, butylene terephthalate and vinyl acetate homopolymers and copolymers.

7. The method as claimed in claim 1, wherein the polymer P1 is a polyacrylic polymer chosen from acrylamide, methyl acrylate, ethyl acrylate, propyl acrylate, butyl acrylate, ethylhexyl acrylate, stearyl acrylate, ethylene glycol diacrylate, triethylene glycol dimethacrylate, methyl methacrylate or acrylic acid homopolymers and copolymers.

8. The method as claimed in claim 1, wherein the polymer P1 is chosen from acrylonitrile homopolymers and copolymers, vinyl acetate and vinyl alcohol homopolymers and copolymers, homopolymers and copolymers of the carbonate of bisphenol A, polyethyleneimines and vinylpyrrolidone or vinyl sulfone homopolymers and copolymers.

9. The method as claimed in claim 3, wherein the salt is introduced into the material by adding said salt in solution in a volatile solvent selected from the group consisting of acrylonitrile, acetonitrile, cyclohexanone and tetrahydrofuran.

10. The method as claimed in claim 1, wherein, during the step of producing the film, the film is obtained from the viscous solution, by extrusion or by coating on a substrate, followed by a drying step.

11. The method as claimed in claim 10, wherein the substrate used for the coating is a metal foil or mesh capable of serving as collector for the electrode.

12. The method as claimed in claim 1, wherein the active electrode material M1 is chosen from: Li$_{1+x}$V$_3$O$_8$, where $0 \leq x \leq 4$; Li$_x$V$_2$O$_5$.nH$_2$O (where $0 \leq x \leq 3$ and $0 \leq n \leq 2$); LiFePO$_4$; hydrated or unhydrated iron phosphates and sulfates; hydrated or unhydrated vanadyl phosphates and sulfates; LiMn$_2$O$_4$ and compounds derived from LiMn$_2$O$_4$ that are obtained by substituting Mn with Al, Ni or Co; LiNiO$_2$; LiMnO$_2$ and compounds derived from LiMnO$_2$ that are obtained by substituting Mn with Al, Ni or Co; or LiCoO$_2$ and compounds derived from LiCoO$_2$ that are obtained by substituting Co with Al, Ti, Mg, Ni or Mn.

13. The method as claimed in claim 1, wherein the active electrode material M1 is chosen from:
- carbon compounds;
- lithium alloys of the $Li_xM$ type (where M=Sn, Sb S or Si) that are obtained from SnO, from $SnO_2$, from Sn, Sn—Fe(—C) compounds, from S1 compounds or from Sb compounds; or
- $Li_xCu_6Sn_5$ compounds (where $0 \leq x \leq 13$), iron borates, pnictures (chosen from $Li_{3-x-y}Co_yN$, $Li_{3-x-y}Fe_yN$, $Li_xMnP_4$, $Li_xFeP_2$ and $Li_xFeSb_2$), simple oxides that undergo reversible decomposition, and insertion oxides, such as $MoO_3$ or $WO_3$ titanates.

14. A material obtained by the method as claimed in claim 1, comprised of at least one polymer P1 that has an O, N, P or S heteroatom mass content of 15% or higher, at least one polymer P2 that has an O, N, P or S heteroatom mass content of 5% or less, a material C1 conferring electronic conductivity, an active electrode material M1 and at least one nonvolatile solvent S1, wherein, both on the micron scale and the submicron scale:
- the polymer P1 and the material C1 conferring electronic conductivity form a dense, homogeneous and continuous phase around the particles of active material;
- the polymer P2 is in the form of a dispersed phase which contains no or very little material C1 and the morphology of which phase, which is of the sphere, cylinder, needle or ribbon type, creates porosity.

15. The material as claimed in claim 14, wherein it contains a salt.

16. A composite electrode, wherein it is comprised of a film of a composite material as claimed in claim 14 deposited on a collector.

17. A composite electrode, wherein it is comprised of a film of a composite material as claimed in claim 15 deposited on a collector.

18. The composite electrode as claimed in claim 17, wherein the salt of the composite material is a lithium salt chosen from $LiPF_6$, $LiAsF_6$, $LiC_4BO_8$, $LiClO_4$, $LiBF_4$, $Li(C_2F_5SO_2)_2N$, $LiCF_3SO_3$, $LiCH_3SO_3$, $Li[(C_2F_5)_3PF_3]$ or $LiN(SO_2CF_3)_2$.

19. The composite electrode as claimed in claim 17, wherein the salt of the composite material is a salt having a cation chosen from the cations: $R_3O^+$ (oxonium), $NR_4^+$ (ammonium), $RC(NHR_2)_2^+$ (amidinium), $C(NHR_2)_3^+$ (guanidinium), $C_5R_6N^+$ (pyridinium), $C_3R_5N_2^+$ (imidazolium), $C_3R_7N_2^+$ (imidazolinium), $C_2R_4N_3^+$ (triazolium), $SR_3^+$ (sulfonium) $PR_4^+$ (phosphonium), $IR_2^+$ (iodonium) or $(C_6R_5)_3C^+$ (carbonium), in which the radicals R may be identical or different, said radicals being chosen from alkyl, alkenyl, oxaalkyl, oxaalkenyl, azaalkyl, azaalkenyl, thiaalkyl, thiaalkenyl, silaalkyl, silaalkenyl, aryl, arylalkyl, alkylaryl, alkenylaryl, dialkylamino or dialkylazo radicals.

20. The composite electrode as claimed in claim 19, wherein the radicals R preferably have at most 5 carbon atoms.

21. A battery formed by a positive electrode and a negative electrode separated by an electrolyte that includes a lithium salt, wherein at least one of its electrodes is an electrode as claimed in claim 16.

22. A supercapacitor formed by two electrodes separated by an electrolyte, wherein at least one of the electrodes is an electrode as claimed in claim 16.

23. The method as claimed in claim 4, wherein the volatile solvent is chosen from acrylonitrile, acetonitrile, cyclohexanone or THF.

24. The method as claimed in claim 1, the volatile solvent is selected from the group consisting of acrylonitrile, acetonitrile, cyclohexanone and tetrahydrofuran.

25. A battery formed by a positive electrode and a negative electrode separated by an electrolyte that includes a lithium salt, wherein at least one of its electrodes is an electrode as claimed in claim 18.

26. A supercapacitor formed by two electrodes separated by an electrolyte, wherein at least one of the electrodes is an electrode as claimed in claim 19.

* * * * *